Fig. 2

May 26, 1942.   G. P. TORRENCE ET AL   2,284,497
APPARATUS FOR THE MANUFACTURE OF THREAD OR THE LIKE
Filed May 26, 1939    8 Sheets-Sheet 4

Inventors
GEORGE P. TORRENCE
RICHARD F. BERGMANN AND
WALTER F. KNEBUSCH
BY Charles P. Herrstrom
Attorney

Inventors
GEORGE P. TORRENCE
RICHARD F. BERGMANN AND
WALTER F. KNEBUSCH
BY
Attorney

Fig.12

May 26, 1942.　　G. P. TORRENCE ET AL　　2,284,497

APPARATUS FOR THE MANUFACTURE OF THREAD OR THE LIKE

Filed May 26, 1939　　8 Sheets-Sheet 8

Inventors
GEORGE P. TORRENCE
RICHARD F. BERGMANN AND
WALTER F. KNEBUSCH
BY Charles P. Herrstrom
Attorney Patented May 26, 1942

2,284,497

UNITED STATES PATENT OFFICE 2,284,497

APPARATUS FOR THE MANUFACTURE OF THREAD OR THE LIKE

George P. Torrence, Shaker Heights, Richard F. Bergmann, Lakewood, and Walter F. Knebusch, Rocky River, Ohio, assignors to Industrial Rayon Corporation, Cleveland, Ohio, a corporation of Delaware Application May 26, 1939, Serial No. 275,919

15 Claims. (Cl. 18—8)

This invention relates to apparatus for handling material of the nature of thread or the like, hereinafter referred to as thread; more particularly, to improved apparatus which may be advantageously employed in the continuous processing of thread. The invention has especial advantages when employed in connection with the manufacture according to a continuous wet spinning process of synthetic thread or the like; e. g., viscose artificial silk thread, on apparatus generally similar to that shown, described and claimed in Knebusch et al. Patent 2,225,642. It will be described hereinafter as applied to the manufacture of viscose artificial silk thread by means of apparatus operating on the general principle of that disclosed in said patent.

In apparatus of this type, each thread is continuously but temporarily stored in a large number of generally helical turns, usually on each of a series of thread store devices arranged in processing sequence. The thread is subjected to liquid processing treatment while so stored, after which it is dried. As many as a hundred or more threads, each requiring several of such thread store devices for its production, may be produced on a single machine, this in order that the large simultaneous production of thread necessary to commercial operation be attained in as compact a space as possible with equipment costs per thread kept at a minimum.

Because of the time, labor, and loss of production involved in starting the large number of threads on the hundreds or thousands of devices which may be employed in a single machine, one of the chief desiderata of a commercially practicable continuous processing apparatus is that it shall operate for long periods of time; i. e., weeks and even months, without being shut down. It is desirable, therefore, if not necessary that all parts of the machine, which may be quite large, be readily accessible for maintenance purposes and that it be possible to service parts and even replace them while the machine is operating. The present invention eminently satisfies these requirements: portions of the apparatus for the production of individual threads may be shut down for maintenance purposes, and even be replaced, without the necessity of shutting down the whole machine.

Another important desideratum is that such a machine, although of large size; e. g., 50 or more feet long, 10 or 15 feet wide, and 20 or more feet high, shall be of sufficient rigidity so that a large number of moving parts can be accurately mounted thereon without binding. Yet the machine must be simple, characterized by low construction costs, and capable of easy assembly. It is particularly desirable from the time, labor, and cost standpoints that it be possible to manufacture the parts of such a machine elsewhere and assemble them in the thread manufacturing plant; so that the construction of such a machine in position will involve primarily an assembly operation rather than a building operation. The present invention provides such advantages of simplicity, rigidity, low cost construction and ease of assembly.

Other advantages of the invention will in part be obvious and will in part be apparent from the following description.

The accompanying drawings, in which like reference characters refer to like parts throughout, illustrate a preferred form of invention, together with a modification thereof.

Figure 9 is a detail sectional elevation on an enlarged scale of the upper portion of the inclined banks of thread store devices of Figure 2, while

The remaining figures show the apparatus with certain parts omitted for the sake of clearness, such omitted parts including the coagulating trough, the thread store devices and associated apparatus, and sundry other moving parts. In effect, these figures show the frame structure of the apparatus in the course of construction. Of these figures.

Figure 2:
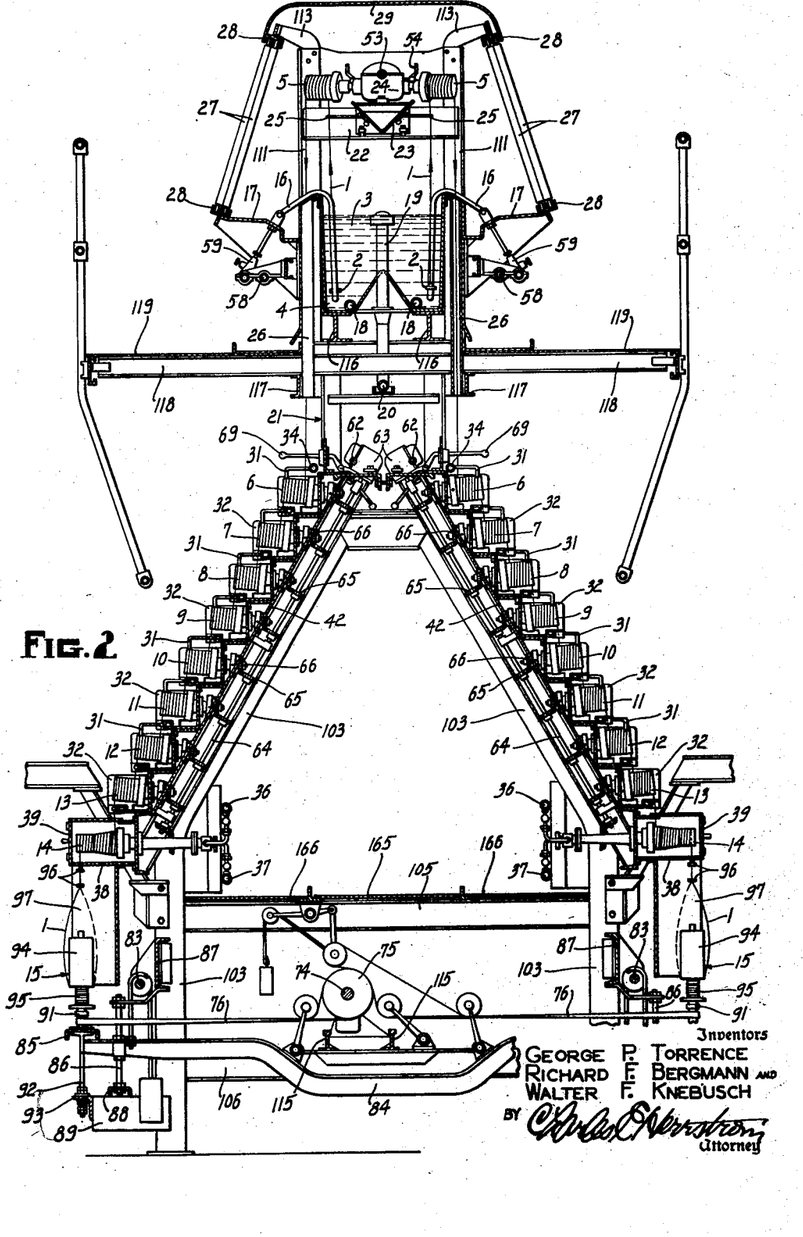
Figure 2 is a sectional elevation through the apparatus on line 2—2 of Figure 3.
Figure 3:
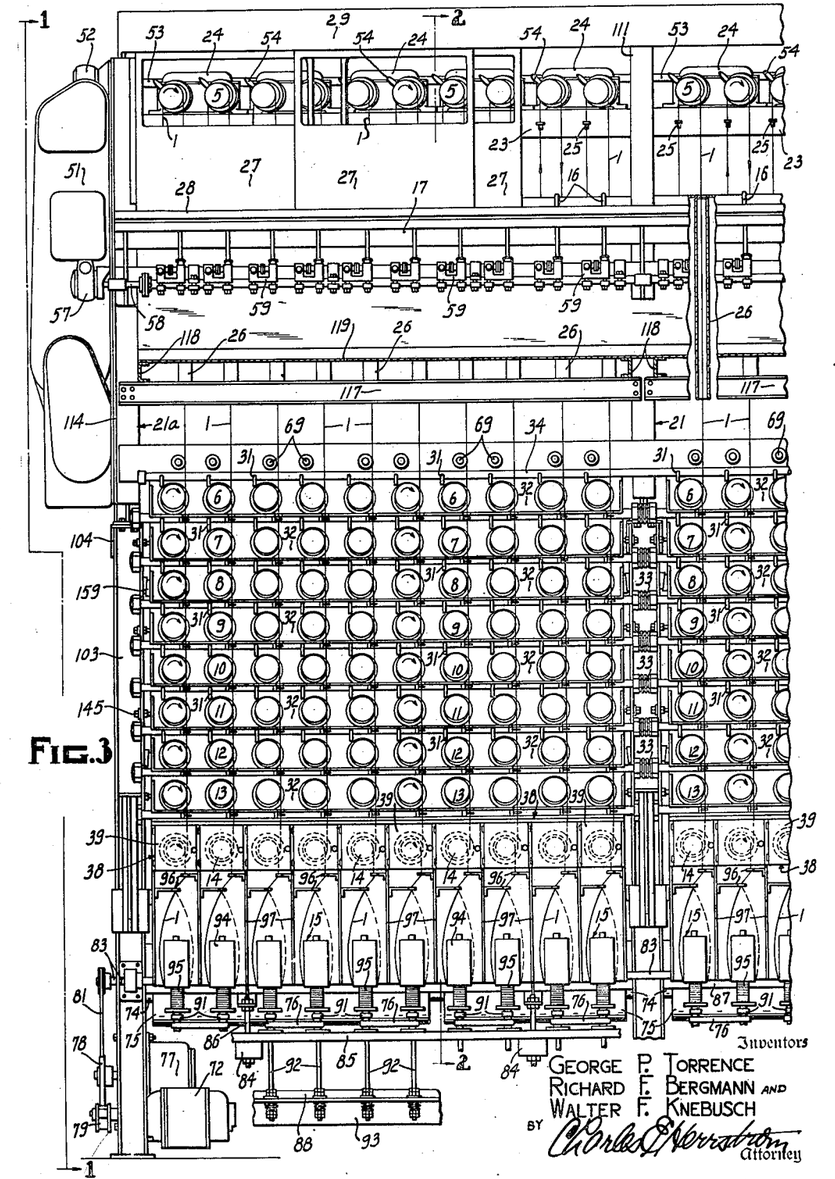
Figure 3 is a side elevation of a portion of the apparatus from line 3—3 of Figure 1.

In the apparatus illustrated in Figures 2 and 3 as embodying the invention, each thread 1 is formed by extrusion of viscose from spinneret 2 into a coagulating bath 3 contained in trough 4. The thread is withdrawn from trough 4 by a suitable thread store device 5 which advances it in closely spaced, generally helical turns to a point beyond one lateral edge of the trough, the thread then passing downward to the first of a series of like thread store devices disposed below said trough, which devices in the drawings bear reference numerals 6 to 14, inclusive. On each of said devices the thread is stored in closely spaced, generally helical turns which are advanced axially of the device by the action of the elements thereof, the thread being meanwhile subjected to suitable processing treatments. After leaving the lowermost device of the series, the thread passes to collecting means such as the cap twister 15.

The thread store devices mentioned above take the form of thread-advancing reels, each being supported from one end only and having its other end unsupported and unobstructed. Said reels are adapted, upon rotation, to advance the threads from the supported to the unsupported ends thereof. In the illustrated apparatus, the reels are disposed in stepped arrangement with the unsupported ends of all reels extending in the same direction and with the unsupported end of each reel in a given thread-handling series in apposite relation to the supported end of the next succeeding reel. Numerous advantages are provided by such an arrangement which, among other things, makes possible to have ready access to the reels for operating purposes.

The reels shown in the illustrated apparatus are preferably similar to those shown, described and claimed in Torrence et al. Patent 2,217,716.

Because of the stepped arrangement of reels, the illustrated apparatus in effect comprises two oppositely inclined banks of reels. When, as in Figures 1 and 2, the machine is viewed from the end, the portion of the machine embodying said inclined banks has the appearance of an inverted V. The thread-producing units, each of which includes a spinneret, a series of reels, and a cap twister, are thus disposed along and on opposite sides of the common coagulating trough 4 which extends longitudinally of the machine as a whole. In the illustrated apparatus, corresponding parts of adjacent thread-producing units may thus be disposed in corresponding positions lengthwise of the machine, a feature which provides numerous benefits such as economy of construction, advantages in driving the various portions of the apparatus, advantages in supplying and removing processing media from the reels, etc.

As shown in Figure 2, the spinnerets 2 are carried by mass tubes 16 pivotally mounted on aprons 17 on the opposite sides of the common coagulating trough 4. Coagulating liquid is supplied to said trough from pipes 18 and is removed therefrom through spaced pipes 19 communicating with a drain 20 extending longitudinally of the machine, the upper ends of pipes 19 being disposed at the desired elevation to maintain the correct liquid level in the coagulating trough. As will be described in greater detail hereinafter, coagulating trough 4 is carried by upright frame members 21, 21a which support the upper portion of the apparatus as a whole.

Each of said upright frame members 21, 21a includes a cross beam 22 supporting the longitudinally extending beams 23 on which are mounted the gear boxes 24 by means of which reels 5 are supported and driven. To aid in guiding the thread on said reels, suitable guides 25 supported by longitudinally extending beams 23 are provided. Said upper reels 5 in the illustrated embodiment of the invention have no processing media applied thereto other than the coagulating liquid carried up by the thread to said reels, thus providing increased coagulating periods for the threads stored thereon. Each also serves as means for conducting its corresponding thread 1 beyond the corresponding edge of the coagulating trough 4.

The thread from the unsupported end of each of said reels 5 passes downward through a vertically extending channel 26 disposed at the edge of trough 4 to the corresponding series of reels 6 to 14, below. Each of said channels serves as a convenient protected passageway for transferring the thread from the upper reels 5 to the lower reels, particularly in the threading up operation, since in such operation the thread can be merely dropped through said channel. In the illustrated apparatus, one of said channels is provided for each thread, but if desired the channels may be so constructed as to accommodate more than one thread.

In the illustrated apparatus, moreover, the space above the coagulating trough 4 is enclosed by means of sliding doors 27 which doors are movable longitudinally in upper and lower tracks 28 carried at the edges of aprons 17 and by the upper ends of frame members 21. The vapors from the enclosed space above the coagulating trough are exhausted through ventilating hood 29. Such enclosure of the space above the coagulating trough prevents the dissemination of vapors which might be injurious to other parts of the apparatus because of possible corrosive action. Access to the upper portion of the apparatus can be obtained by sliding the overlapping doors 27 lengthwise of the apparatus as shown, for instance, in Figure 3.

On reels 6 to 12, inclusive, suitable processing liquids are applied to the thread. In the manufacture of viscose artificial silk thread, liquids for completing coagulation, washing, desulphurizing, bleaching, oiling, etc., may be applied to the thread on such reels. On reel 13 no processing liquid is shown as applied to the thread; instead, the liquid applied to the thread on the preceding reel is permitted to drip therefrom preparatory to drying the thread on reel 14.

On each of the reels on which the thread is subjected to liquid processing treatment, from a reagent distributor 31 disposed above the reel and is collected in a suitable collecting trough 32 disposed below the reel, a similar trough being disposed below drip reel 13. Because corresponding reels are disposed in corresponding positions lengthwise of the apparatus, the collecting troughs 32 may extend below a plurality of corresponding reels in adjacent series, as shown in Figure 3. Thus in the illustrated apparatus the collecting troughs extend below the corresponding reels of ten adjacent series, corresponding collecting troughs being connected together by suitable couplings 33.

Figure 9:
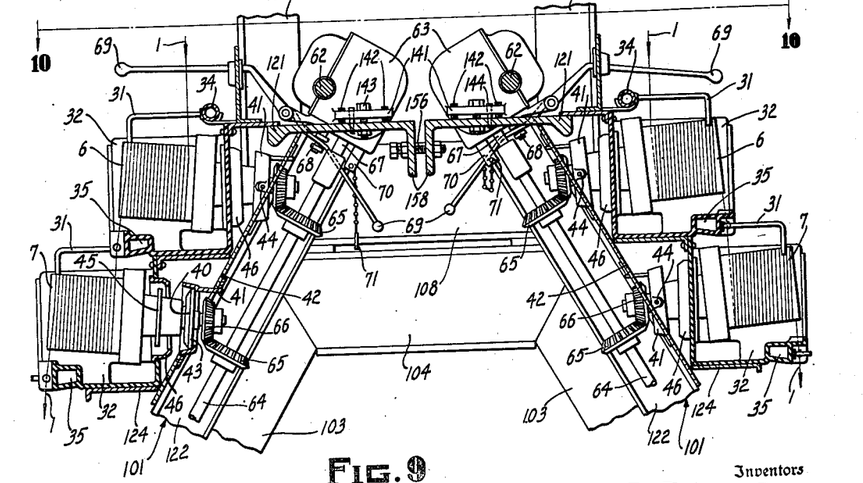

The reagent distributors 31 for the first liquid processing reels 6 on each side of the apparatus are supplied from a pipe 34 extending longitudinally of the apparatus. The reagent distributors for the other reels are supplied from conduits 35 formed integrally with the collecting troughs for the preceding reels, as is shown in Figures 2 and 9. The reagents may be supplied to the respective pipes or conduits 34 and 35 and drained from the troughs 32 by suitable means, not shown, disposed at one end of the apparatus, the reagents being discharged to the sewer or recirculated, if desired.

In the illustrated apparatus, the reels on which liquid is applied to the thread are tilted somewhat from the horizontal, since by this means a countercurrent flow of liquid is obtained, as well as other advantages resulting in economy in consumption of the liquid.

The reels 14 on each side of the apparatus on which the thread is subjected to a continuous drying action are internally heated by hot water or steam circulated through the interior of each of the reels by the supply and discharge conduits 36, 37 which extend longitudinally of the interior of the machine along each side thereof. The reels 14 on each side of the apparatus are enclosed in suitable housings 38, a hinged door 39 being provided in association with each reel 14 to permit access thereto. When open, the door exposes the unsupported end and the top of each reel. Such housings permit accurate control of the drying conditions to which each of the reels 14 is subjected.

In the apparatus shown, reels 6 to 14, inclusive, are demountably supported by virtue of the fact that, together with their supporting members 40, they are mounted in cuplike members 41 fixed, as by welding, to the supporting structure of the apparatus. As shown in Figures 2, 9, 10, 13 and 14, the cuplike members 41 for reels 6 to 13, inclusive, are welded to an inclined plate 42 forming part of the apparatus frame which plate has openings therein to receive such members. As illustrated in Figure 9, supporting member 40 for each of the reels is provided with a suitable flange member 43 which is rigidly held in its corresponding cup member 41 by set screws 44 threaded into said cup member 41 and bearing against said flange member: by merely loosening such set screws, the entire reel can be removed. A flange 45 mounted on the hub of the reel cooperates with a cuplike member 46 mounted in the back portion of the coagulating trough to form a seal to prevent liquid from traveling to the rear portion of the reel.

In the illustrated apparatus, reels 5 are similarly supported by cuplike members associated with the gear boxes 24.

As will be apparent from Figures 1 to 9, inclusive, all of the reels, and, indeed, all of the moving parts of the apparatus other than the cap twister mechanism, are driven in timed relation by means of a motor 49 mounted at one end of the apparatus on upright frame member 21a. By means of chain drive mechanism contained in housing 51, motor 49 drives shaft 53 through reduction gears in housing 52. Shaft 53 extends longitudinally of the apparatus through each of the upper gear boxes 24, serving thereby to drive all of the upper reels 5. By means of clutch mechanism in said gear boxes actuated by handles 54, the drive means for each of reels 5 may be disconnected from shaft 53.

Through a suitable change speed mechanism, such as PIV unit 55, the motor 49 also drives cross shafts 56. The latter in turn drive shafts 58 through suitable reduction gear units 57. Shafts 58 serve to drive the spin pumps 59, to that end being disposed one on each side of the apparatus below aprons 17. Each spin pump 59 is connected to its corresponding mass tube 16. By means of the change speed unit 55, the relative speeds of the spin pumps and the reels 5 can be varied, as is necessary, for example, when the size of the thread being formed is changed or when it is desired to vary the thread stretch between the spinnerets and the reels 5.

Through other suitable chain mechanism in housing 51, the motor 49, with the aid of suitable reduction gears, drives shafts 62 from a common shaft contained in housing 61. Each of said shafts 62 extends longitudinally of the apparatus and serves reels 6 to 14, inclusive, on one side of the apparatus. Said shafts 62 are disposed at the apex of the inverted V defined by the inclined banks of reels. Each of said shafts runs through a plurality of gear boxes 63, each gear box containing the gears and clutch mechanism connecting said shaft 62 to inclined drive shafts 64 for the downwardly extending series of reels 6 to 14, inclusive. Each of said shafts 64 has mounted along its length a plurality of gears 65, each of which meshes with a gear 66 mounted on the drive shaft of one of the reels 6 to 14, inclusive.

Said gear boxes 63 have journalled therein stub shafts 67 coupled to corresponding inclined drive shafts 64. Suitable clutch mechanism in said gear boxes for disengaging each drive shaft 64 from the drive shaft 62 is actuated by the plunger 68, which in turn is actuated by the pivotally mounted lever 69. Each of said levers 69 is provided with a grasping portion which is accessible from the operating face of the bank of reels and with another grasping portion accessible from the interior of the apparatus. Thus each downwardly extending series of reels 6 to 14, inclusive, can be disconnected from the drive mechanism either by an operator working at the operating face of the apparatus or by one in the interior of the apparatus.

If desired, means may be provided for locking the clutch lever 69 in the disconnected position from the interior of the apparatus, so that it will not be possible to start the reels rotating from the operating face of the machine and thus injure an operator in the interior of the machine working at the gears 65, gears 66, or shaft 64. In the illustrated apparatus, as shown in Figure 9, such means takes the form of a clevis 70 into which the interior projecting portion of the lever 69 fits when the clutch is in the disengaged position and in which it is locked by pin 71. The right-hand lever in Figure 9 is shown as locked in the disengaged position.

While any one of various other collecting means than the cap twister mechanism shown may be employed, that illustrated has been found to be advantageous for this type of apparatus.

Figure 1:
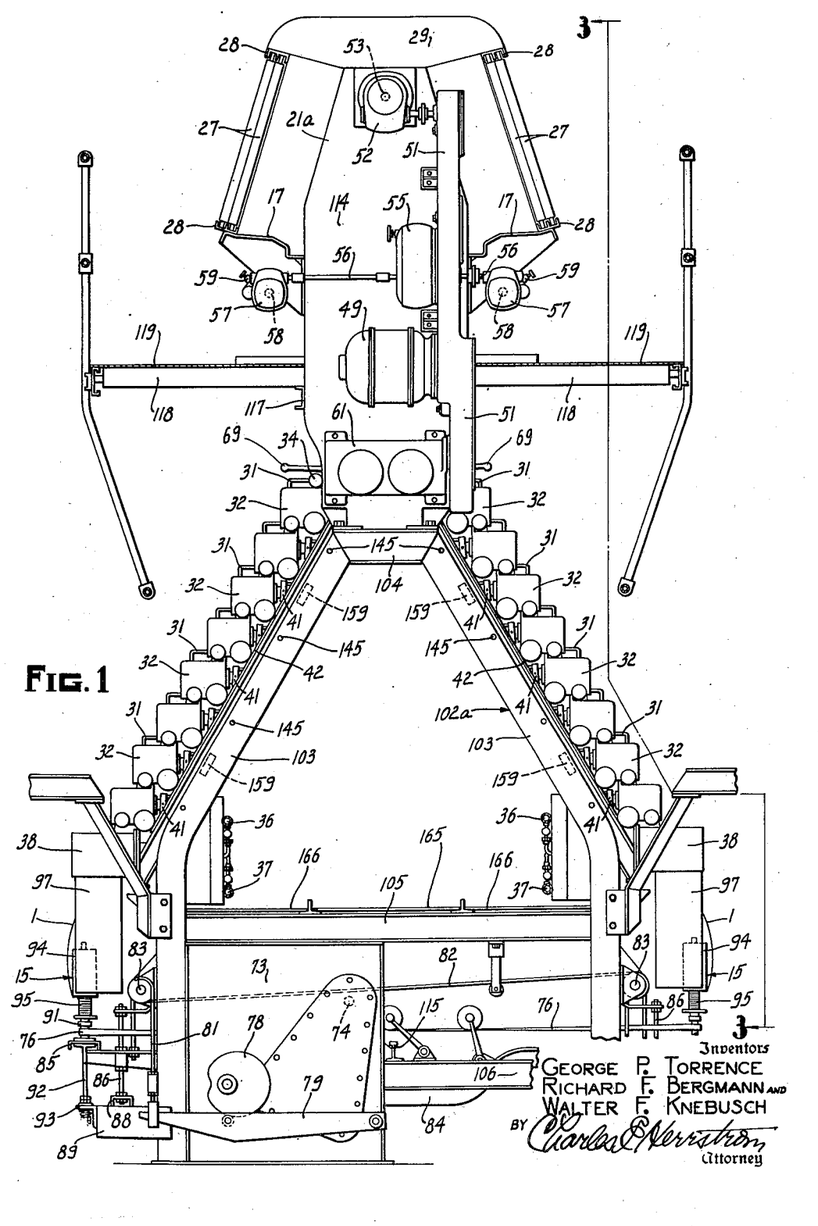
Figure 1 is an end elevation, generally corresponding to line 1—1 of Figure 3, of the preferred form of the invention from the end of the apparatus at which the driving means are located.

As is apparent from Figures 1, 2 and 3, the motor 72, through suitable chain drive mechanism contained in housing 73 forming part of the frame of the apparatus, rotates the shaft 74 which extends longitudinally of the apparatus. Said shaft has mounted thereon a plurality of drums 75 (Figure 2) which drive the belts 76 for rotating the cap twister whirls. Motor 72 also drives slowly rotating cam 78 through said chain drive mechanism and suitable speed-reducing mechanism 77. Cams 78 actuates the lever 79 which, through a suitable tension member 81 and cross tension member 82, in turn imparts a rotative oscillatory motion to the shafts 83, one of which extends longitudinally of the apparatus along each side thereof.

Suitable tension members connected to said shafts impart a vertical reciprocatory motion to the cross members 84. Several such cross members are provided at intervals lengthwise of the apparatus, two being rigidly connected to each pair of lifting rails 85 on opposite sides of the apparatus. On each side of the apparatus, said cross members 84 are slidably mounted on vertical guide rods 86 connected at their upper ends to a beam 87 forming part of the frame structure of the apparatus and at their lower ends to a beam 88 mounted on brackets 89 fixed to the frame of the apparatus. Shafts 83 are mounted in bearings carried by beams 87.

As in conventional practice, each cap twisting unit comprises a rotatable whirl 91 mounted on its corresponding lifting rail 85 and slidably mounted about a vertical spindle 92 which is connected at its lower end to the fixed rail 93 rigidly connected to the brackets 89. At its upper end, spindle 92 supports the cap 94 with respect to which the collecting bobbin 95 supported by the whirl 91 reciprocates. In operation of the apparatus, the whirls are rapidly rotated by the belts 76 driven by the drums 75 and are slowly vertically reciprocated through the agency of shafts 83 and their associated tension members and lever 79 from the cam 78, thus imparting a twist to the thread passing to each cap twister from its corresponding reel 14 through guides 96. In the illustrated apparatus, suitable shields 97 are provided to prevent the balloons of adjacent cap twisters from entangling.

The cap twisting apparatus above described forms no part of the present invention but is shown, described, and claimed in Bergmann et al. Patent 2,203,665.

As is particularly apparent from Figures 1, 2 and 11 to 14, inclusive, the frame structure of the illustrated apparatus comprises a substantially rigid, self-supporting, skeletal structure indicated generally as 100, together with what might for lack of a better term be described as a plurality of unitary panel structures 101 supported thereby. Each of said panel structures carries the reels of several adjacent series, the drive mechanism therefor, the reagent supply and collecting means and associated apparatus, and is rigidly carried by the supporting structure 100. As shown in both of the illustrated embodiments of the invention, said panel structures may be adjustably mounted on said supporting structure.

In the illustrated apparatus, the supporting structure 100 includes a plurality of spaced, upright main frame members 102, 102a. When viewed longitudinally of the machine, said main upright frame members 102, 102a are in cross-section substantially A-shaped: they include side beams 103, upper cross beam 104 and lower cross beam 105. The space between the side beams 103 and upper and lower cross beams 104 and 105 is entirely unobstructed. The main upright members are themselves of rigid construction. In general, all main upright frame members are similar, the drive end upright frame member 102a, however, differing from the remaining frame members 102 in that it is provided with the housing 73 containing a portion of the drive mechanism for the cap twisting apparatus.

In the main upright frame members, the side beams 103 are bent from standard sections, the angle of inclination of the upper portions thereof being the same as the angle of inclination of the banks of reels supported thereby. The upper cross beam 104 and lower cross beam 105 are welded to said side beams, each of said frame members also having welded therein a lowermost cross member 106 for supporting portions of the cap twisting apparatus. In the end frame member 102a, however, the lowermost cross beam 106 extends from one of the side members 103 to the housing 73. Said frame members 102, 102a can thus be of all welded construction, as a result of which they embody the desired degree of rigidity and accuracy with a low construction cost and light weight. They can, as shown, be substantially entirely constructed of standard sections.

Each main upright frame member 102 has bolted on its upper cross beam 104 one of the superstructure upright frame members 21, while drive end upright member 102a has bolted through the superstructure drive end upright member 21a. As is apparent from Figures 1, 2 and 9 to 12, inclusive, the tops of the main upright frame members 102, 102a are disposed below the tops of the panel structures 101. Thus a wider supporting base than could otherwise be provided is supplied for supporting the superstructure upright members 21, 21a, thereby imparting stability to the superstructure.

Figure 11:
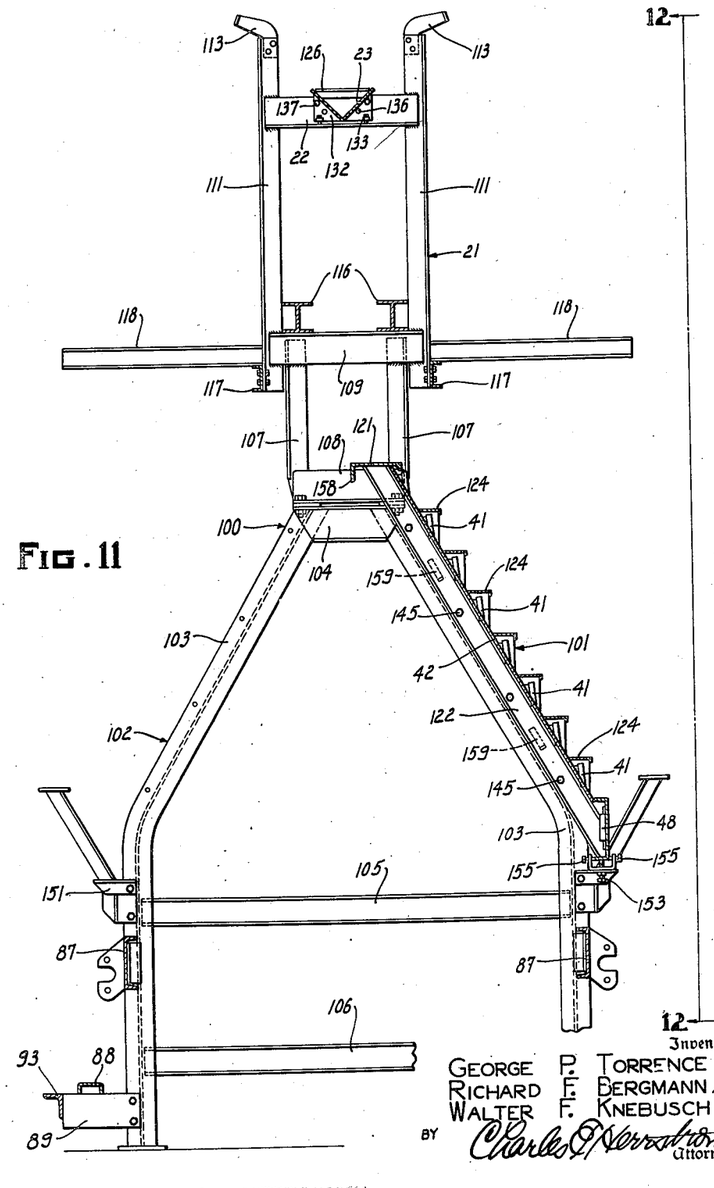
Figure 11 is a sectional elevation from line 11—11 of Figure 12 corresponding generally to the section of Figure 2, one of the panel structures being omitted for the sake of clearness.
Figure 12:
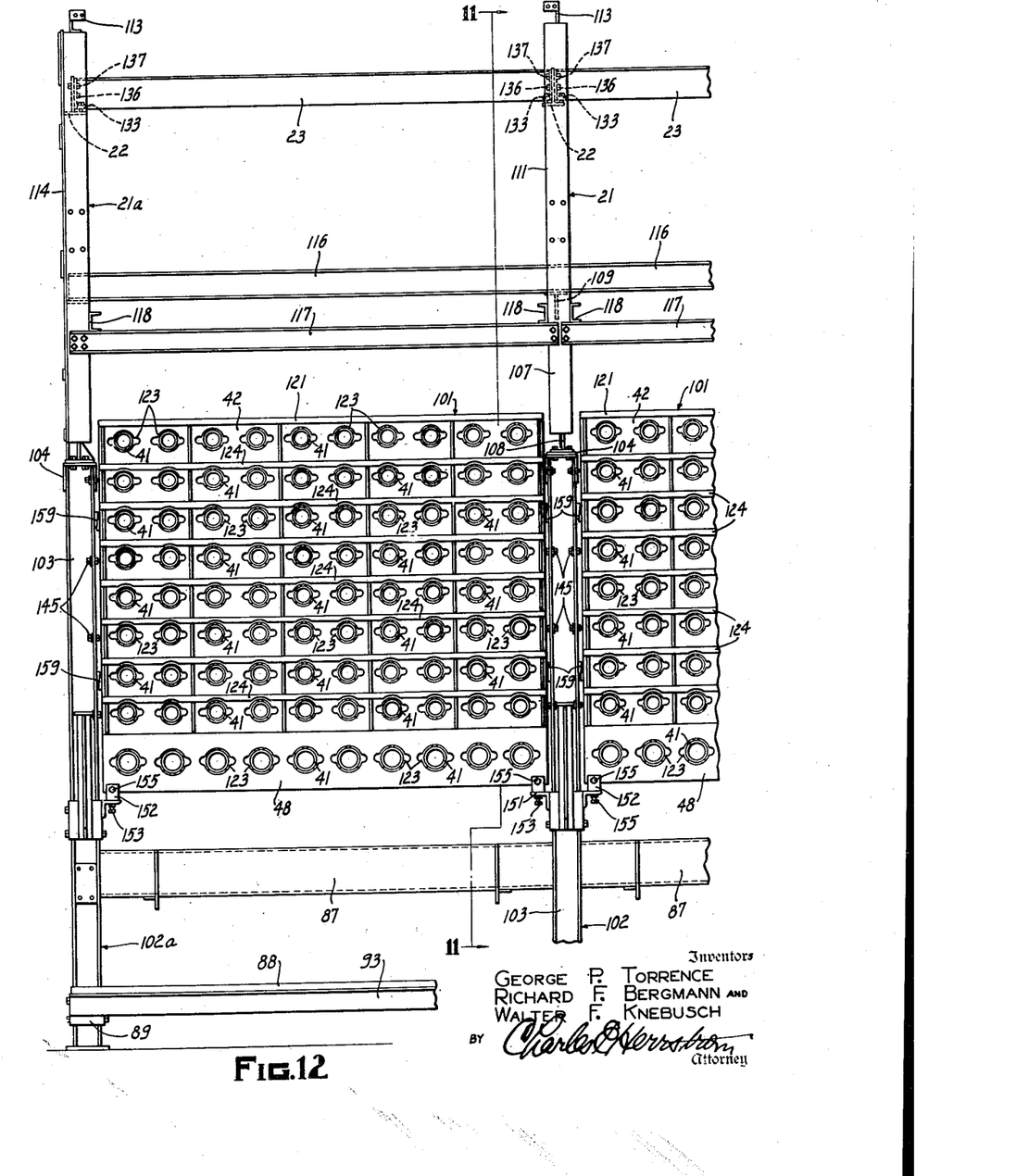
Figure 12 is a side elevation of the apparatus of Figure 11 from line 12—12 thereof, this portion of the apparatus corresponding generally to the portion shown in Figure 3.

As shown in Figures 2, 11 and 12, each of upright members 21 is built up of standard sections and is substantially entirely of welded construction. It comprises vertical members 107 welded at the bottom to flanged cross member 108 by means of which the member 21 is bolted to member 102 and at the top to intermediate cross member 109. Welded to said intermediate cross member 109 and to said vertical member 107 on the outer sides thereof are spaced upright members 111, to which is welded upper cross beam 22 for supporting the longitudinal beams 23. Upright members 111 also carry brackets 113 supporting the ventilating hood 29 and upper tracks 28 for the sliding doors 27. Drive end upright supporting member 21a is generally similar in construction except that it has welded thereto a plate 114 on which are mounted the motor 49, PIV unit 55, chain housing 51, and reduction gear units 52 and 61, substantially as shown in Figure 1.

The various beams extending longitudinally of the apparatus between the upright frame members impart longitudinal stability and rigidity to the skeletal supporting structure 100. Thus in the lower portion thereof, the main upright frame members 102, 102a are rigidly connected together by the beams 87, which also support such portions of the cap twisting apparatus as the shafts 83 extending longitudinally of the apparatus and the upper ends of guide rods 86; by guide rod beams 88 and fixed rails 93; and by the subordinate frame structures 115 of the twister section which, as shown in Figures 1 and 2, are connected to cross beams 106 of adjacent upright frame members. The latter support the drive shafts 74 for the cap twister driving drums 75.

The superstructure upright members 21 and 21a are connected together longitudinally by beams 116 fixed thereto, as by being bolted or welded thereto, which beams serve to support the coagulating trough 4 (Figures 2, 11 and 12); by the upper longitudinal beams 23 which support the gear boxes for the upper reels 5; by stiffening beams 117 which also may support the cross beams 118 for the upper platform 119; by the aprons 17, together with upper and lower guide tracks 28 for the doors; and by coagulating trough 4 itself. Consequently, the supporting structure indicated generally by the reference character at 100 is in itself of very rigid construction.

In the illustrated apparatus each of the panel structures 101 comprises a lower main beam 48 and an upper main beam 121, both of which extend longitudinally of the panel and of the apparatus; spaced beams 122, inclined when the panel structure is in position, connecting said upper beam 121 and lower beam 48; and plates 42 supported by said beams. These parts may be standard rolled sections and, as in the apparatus shown, may conveniently be welded together. As is shown in Figures 2, 9 and 11 to 14, inclusive, the plates 42 have openings 123 in which are welded in the desired position the cup members 41 for supporting the reels 6 to 13, inclusive, while lower beams 48 have similar openings 123 in which are welded like cup members for supporting reels 14. Each of said panel structures 101, moreover, has welded thereto a plurality of shelf-like plates 124 at the desired angle to plate 42 for supporting the collecting troughs 32 in the desired horizontal positions when said panel structure is mounted in inclined relation. Each of the illustrated panel structures is of unitary form, extremely rigid, strong, of light weight, and can be fabricated at low cost.

Figure 10:
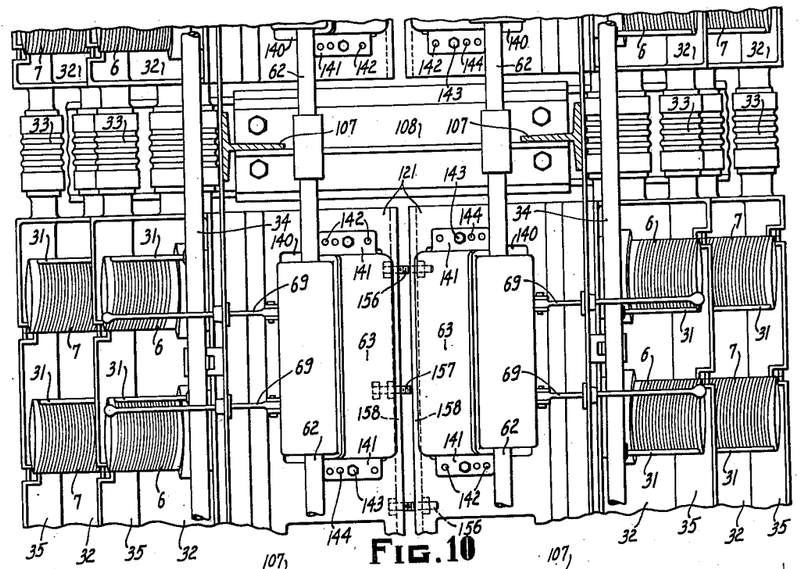
Figure 10 is a corresponding plan from line 10—10 of Figure 9.

As shown in Figures 2, 3, 9, 10 and 12, the reels and associated driving and processing mechanism for a plurality of adjacent downwardly extending series of reels, ten series in the embodiment shown, are carried by each panel structure; indeed, as will be apparent from the drawings, the illustrated apparatus is built in sections of ten thread-producing units on a side, between the upright frame members. In each of such panel assemblies, reels 6 to 14, inclusive, and inclined drive shafts 64 for each series of reels are mounted in accurate driving relation on said panel structure. Moreover, a plurality of gear boxes 63 and an upper shaft 62 extending longitudinally of said panel are mounted on the upper beam 121 of each panel structure 101 in accurate driving relation to the inclined drive shafts 64 mounted on said panel structure. The upper drive shaft 62 on each panel structure is coupled to the corresponding drive shaft 62 of longitudinally adjacent structures as shown in Figure 10, the drive shaft 62 for the panel structure 101 nearest the drive end of the apparatus being coupled to the corresponding reduction gear in housing 61.

Collecting troughs 32 below those of the reels from which processing liquids are discharged are likewise mounted on said panel structures 101 on supporting plates 124, said collecting troughs, as shown in Figure 3, being connected by couplings 33 to corresponding collecting troughs of adjacent panel assemblies. The reagent supply conduits 35 formed integrally with said collecting troughs are, of course, similarly coupled. In the illustrated apparatus, the housings 38 for the drier reels 14 mounted on each panel structure and the balloon shields 97 for the cap twisters corresponding thereto are likewise mounted on said panel structure 101.

The present invention also embraces advantageous means for adjustably mounting the various parts of the apparatus. The adjustable mounting means provided by the present invention are advantageous in that they reduce the amount of machining of apparatus parts which would otherwise be required and in that they eliminate difficulties in aligning shafts and other rotating parts. The novel construction of the apparatus as a whole, embracing a substantially rigid self-supporting skeletal structure which supports unitary panel assemblies, lends itself very well to the type of mounting means provided by the present invention.

The mounting means of the present invention as applied to the supporting means for the reels 5 can be understood with reference to Figures 4 to 8, inclusive.

Figure 4:
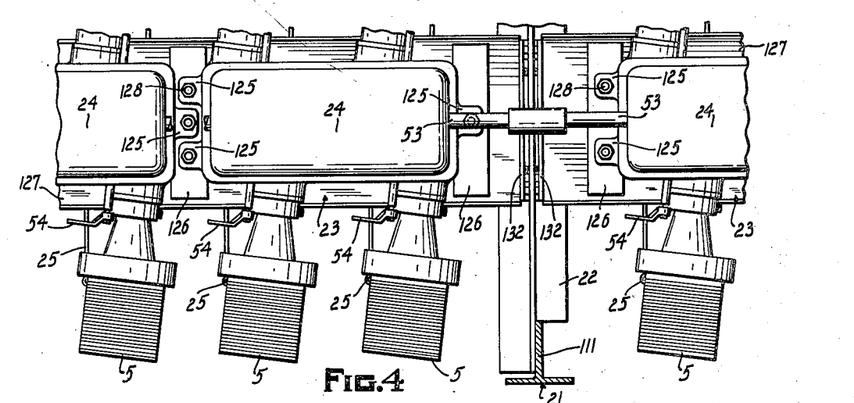
Figure 4 is a plan elevation on an enlarged scale of a portion of the apparatus embodying the uppermost thread store devices and their supporting and driving mechanism; parts being broken away or omitted for the sake of clearness.

As shown by said figures, a plurality of gear boxes 24, each supporting and driving two adjacent reels 5 on a side, is mounted in end-to-end relation on the longitudinal beam 23 disposed centrally above the coagulating trough 4. The reels 5 are driven through such gear boxes by a common shaft 53 passing through a plurality of such boxes. Each longitudinal beam 23 extends between the superstructure uprights 21 or 21a and supports ten reels on a side. A shaft 53 extends through the gear boxes supported by one longitudinal beam 23, the ends of the shafts 53 for the gear boxes supported by the various beams 23 in one machine being coupled together as shown in Figure 4. The end of the shaft 53 adjacent the drive end of the apparatus is, of course, coupled to the reduction gear mechanism 52.

In the apparatus shown, each of the gear boxes 24 is adjustably mounted on its corresponding longitudinally extending beam 23, being supported at three points by means of two spaced lugs 125 at one end thereof and a single lug 125 at the other end thereof. The single lug 125 of each of the intermediate gear boxes 24 is disposed as shown in Figure 4 in interleaved relation between the spaced lugs 125 of the adjacent gear box lengthwise of each beam 23. The lugs 125 are supported on a cross member 126 welded to the angle shaped member 127 forming the body of beam 23. This form of member provides maximum rigidity and stiffness with minimum weight and construction cost.

Figure 8:
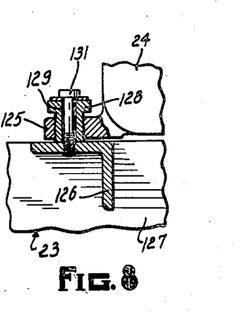
Figure 8 is an elevation to an enlarged scale of a portion of one of the gear boxes of Figures 4 to 6, inclusive, showing in particular one of the means for mounting said gear boxes.

As shown in Figure 8, each lug 125 has threaded therethrough a hollow bolt 128 through the bore 129 of which passes a bolt 131 which is threaded into cross member 126. The bore 129 is sufficiently larger than the diameter of through bolt 131 to permit a certain amount of lateral adjustment of the gear box with respect to the bolt 128. By suitable adjustment of hollow bolts 128 and through bolt 131 in each lug, the gear box 23 supported thereby can be adjusted with respect to the beam 23 and shaft 53 passing therethrough. Consequently, it is a relatively simple matter to align the gear boxes supported by each beam 23 with respect to the shaft 53 passing therethrough.

Moreover, as shown in Figures 4 to 7 and 11, each beam 23 is adjustably supported by upright members 21, 21a.

Figure 5:
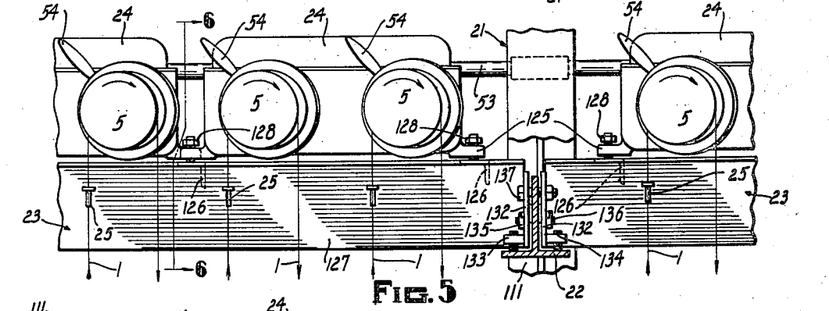
Figure 5 is a side elevation of this portion of the apparatus to the same scale as Figure 4.
Figures 6, 7:
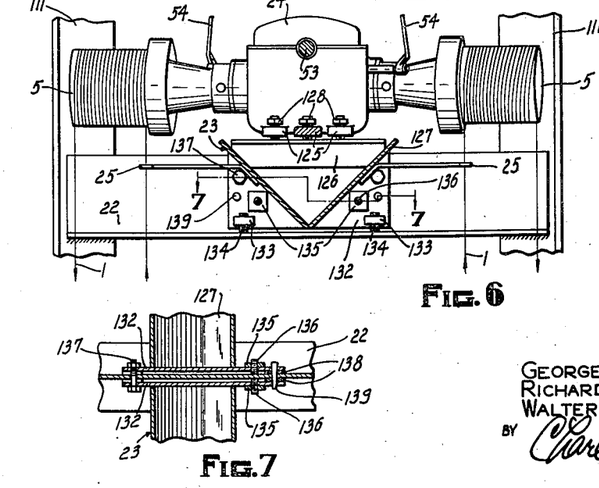
Figure 6 is a sectional elevation through the portion of the apparatus of and on the same scale as Figure 5, the section being taken on line 6—6 thereof.
Figure 7 is a sectional elevation corresponding to line 7—7 of Figure 6 and to the same scale.

To that end, angle member 127 comprising the body of beam 23 has plate 132 welded thereto at each end thereof. As shown in Figure 5, each plate 132 is provided on each side of said angle member 127 with a lug 133 having threaded therethrough a set screw 134. Set screws 134 bear against the bottom flange on the T-shaped cross beam 22 of superstructure upright frame member 21 or 21a. Thus the beam 23 may be adjusted vertically with respect to the apparatus.

Moreover, each plate 132 has welded thereto on opposite sides of angle member 127 a threaded piece 135 in which is disposed a set screw 136 adapted to bear against the vertical web of T-shaped cross beam 22. On each side of the angle beam a bolt 137 also passes through end plate 132 on beam 23 and the web of cross beam 22, being provided with a nut at its threaded end. In the portion of the apparatus shown in Figure 5, said bolt passes through the end plates 132 for two adjacent beams 23.

By means of set screws 136 at each end of each beam 23 it can be adjusted until it is accurately located longitudinally, sufficient space being provided in the openings through which bolt 137 passes to permit lateral adjustment of the beam also. Thus by means of set screws 134 and 136 each beam 23 can readily be accurately located and mounted on the apparatus, being clamped in position by through bolts 137. If desired, after the beams 23 have been accurately located, shims 138 may be inserted between the end plates 132 and webs of cross members 22 and dowel pins 139 inserted through the end plates, cross members 22 and shims 138, the holes for said dowel pins being drilled and reamed in place. Thus a permanent, accurate locating of the beams 23 can be obtained.

With this arrangement, the gear boxes may be assembled and accurately mounted on beams 23 before the beams 23 are mounted on the machine. This is advantageous since the gear boxes may be mounted on the beam 23 and aligned with shaft 53 much more readily on the bench than on the machine. The subassemblies formed of the gear boxes 24, beam 23 and shaft 53 may then be readily installed in the machine, being bodily adjusted as described above. As an alternative, the beams 23 may be mounted on the machine and the gear boxes 24 installed thereafter, if desired.

The gear boxes 63, through the agency of which the inclined drive shafts 64 are driven from the longitudinally extending drive shaft 62 at the apex of the inverted V formed by the inclined banks of reels are similarly mounted on the upper longitudinally extending beams 121 of the panel structures 101 with which they are associated. As shown to advantage in Figures 9 and 10, each of the gear boxes 63 is mounted on the upper beam 121 of the panel structure 101 with which it is associated by means providing adjustment of said gear boxes with respect to said panel structure, the upper beam 121 having openings 140 therein to receive the lower portions of gear boxes 63. Each gear box 63 is provided at each end with a lug 141 having threaded therethrough two spaced set screws 142 which bear against the top of longitudinally extending beam 121. A through bolt 143 passes through each lug 141 and longitudinally extending beam 121, having a nut threaded on its projecting end.

Thus by adjusting the set screws 142 and through bolt 143 at each end of each gear box 63, said gear box can be readily adjusted vertically. Moreover, since the openings in each lug 141 and in longitudinally extending beam 121 through which each through bolt 143 passes may be made somewhat larger than said through bolt, lateral adjustment may be provided. By tightening the nuts on through bolts 143 the gear box 63 can be clamped in place after the desired adjustment has been made. It is desirable, moreover, after the final adjustment has been made, to drill and ream holes through each lug 141 and longitudinally extending beam 121 to permit a dowel pin 144 to be driven therein, thus locking the gear box 63 in place. In the installation of the gear boxes 63 on each panel structure, it is preferable to align them with respect to the common drive shaft 62 before connecting their stub shafts 67 to the corresponding inclined drive shafts 64.

As was the case with the gear boxes 24 for reels 5, the adjustable mounting of the gear boxes 63 provides marked advantages in providing ease of alignment of said gear boxes with respect to their drive shafts 62 and their corresponding inclined drive shafts 64. It is preferable to install and align these gear boxes 63 on the panel structures 101 after they are mounted in the apparatus as a whole, this for the reason that complications would be introduced in the operation of mounting the bulky panel structures on the machine if the gear boxes were mounted on said panels theretobefore.

In the illustrated embodiment of the invention, means are provided for bodily adjusting each entire panel structure 101 with respect to its supporting frame structure 100, at least in the assembling operation. Such means are disclosed in Figures 9 to 17, inclusive, in Figures 11 to 17, inclusive, of which the apparatus is shown as it appears before the reels, reagent distributing and collecting means, and the drive mechanism for the reels have been installed. In the form shown in Figures 9 to 15, inclusive, the panel structure 101 is mounted so that it is capable at least during assembly of a certain amount of movement longitudinally, vertically and horizontally thereof, as well as in any direction involving a combination of such movements.

Figures 13, 14:
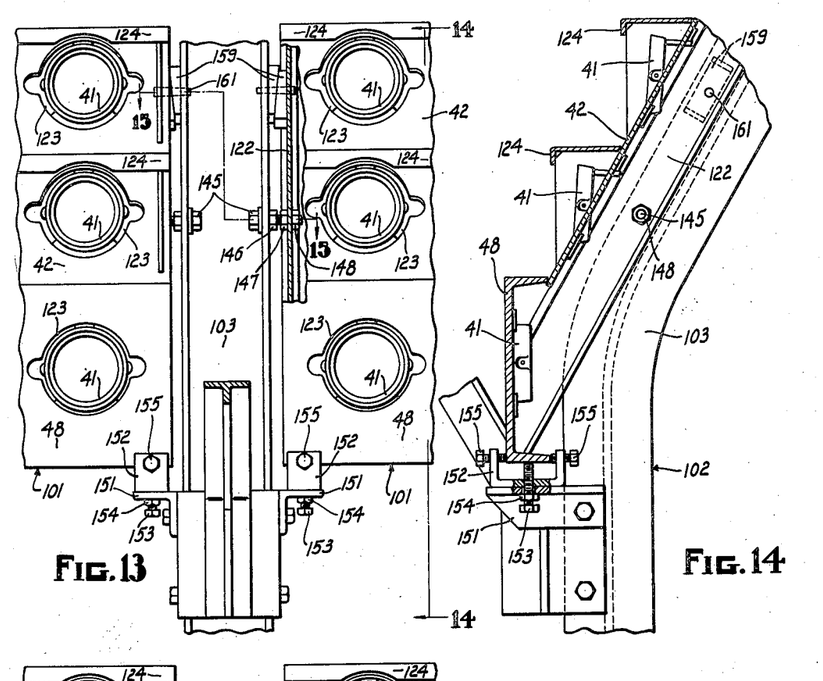
Figure 13 shows on an enlarged scale a portion of one of the upright frame members and the lower portions of two adjacent panel structures supported thereby, representing one way of mounting said panel structures on said upright frame member.
Figure 14 is a sectional elevation from line 14—14 of Figure 13.
Figure 15:
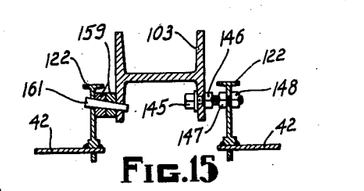
Figure 15 is a detail sectional elevation from line 15—15 of Figure 13.
Figure 16:
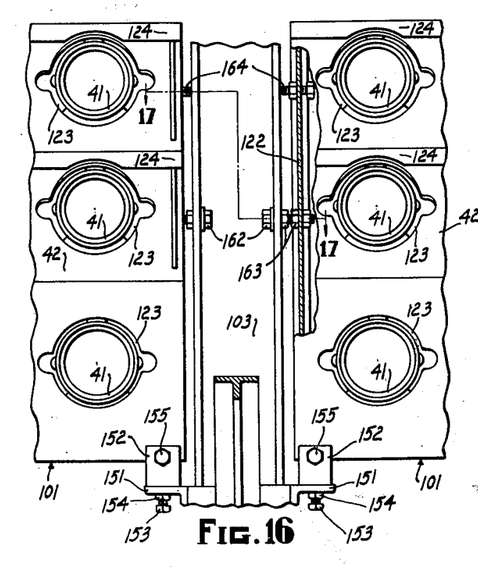
Figure 16 is a side elevation of a portion of a modified form of apparatus, corresponding generally to and on the same scale as that of Figure 13, showing another way of mounting said panel structures on the upright frame members.
Figure 17:
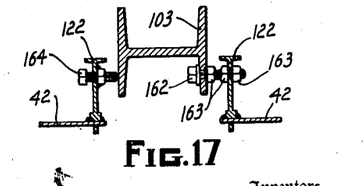
Figure 17 is a detail sectional elevation from line 17—17 of Figure 16.

To that end, each panel structure 101 is connected to the main upright members 102 or 102a by bolts 145, shown in Figures 13 to 15, inclusive, which pass through the end beams 122 of the panel structure and through the adjacent flanges of the inclined portions of the side beams 103 of said main upright frame members 102, 102a. Preferably, as shown in Figure 15, each bolt 145 is provided with a nut 146 clamping the bolt 145 to the flange of beam 103 and with two nuts 147, 148 on opposite sides of the end beam 122 of panel structure 101. By adjustment of nuts 146, 147 and 148 on the suitable bolts 145 during assembly of the apparatus, each panel structure 101 can be adjusted endwise, tilted, etc., as desired, particularly since the openings for the bolts 145 through the flanges of beams 103 and through the end beams 122 of the panel structure 101 may be sufficiently larger than bolts 145 to permit considerable adjustment.

Vertical adjustment of each panel structure 101 with respect to its supporting structure 100 may be accomplished by means similar to that shown in the apparatus of Figures 11 to 14, inclusive. Such means includes a bracket 151 fixed, as illustrated, to each of the beams 103 at a point below the panel structure 101. On said bracket is mounted a U-shaped member 152 having a bolt 153 threaded through the bottom thereof and passing through an opening in said bracket 151, a lock nut 154 being provided, if desired. One of said bolts is provided at each of the lower corners of each panel structure, as shown in Figure 12.

By adjustment of said bolts 153, panel structure 101 or either corner thereof may be adjusted vertically. Bolt 153 may be threaded directly into bracket 151, but in the embodiment shown it is threaded into U-shaped member 152, since the legs of said member also have threaded therein bolts 155 bearing against the front and rear faces of lower longitudinally extending beam 48 of the panel structure 101. By adjustment of said bolts 155 at each lower corner of the panel structure 101, the lower portion of the panel structure may be adjusted toward and away from the center of the machine.

As shown in Figures 9 and 10, by means of a plurality of through bolts 156 and pusher bolts 157 disposed in the vertical flanges 158 of upper longitudinally extending beam 121 of each pair of oppositely adjacent panel structures, the latter may be adjusted toward and away from the axial center line of the machine. As shown in these figures, spaced through bolts 156 pass through the flanges 158 of longitudinally extending upper members 121 of the oppositely adjacent panel structures 101. Threaded into one of said flanges between said through bolts is a pusher bolt 157 which bears against the flange 158 of the other panel structure. A plurality of these groups of through bolts and pusher bolts is disposed the length of each pair of corresponding panel structures 101 on opposite sides of the illustrated machine.

In the assembly of the apparatus as a whole, by means of bolts 145 and their associated nuts on the sides of the panel structure, bolts 153 and 155 in the lower corners of the panel structure, and bolts 156 and 157 in the upper portion of the panel structure, each panel structure can be adjusted until it is accurately located in its supporting structure 100. Cooperating tapered wedges 159 may be employed, preferably two sets on each side of each panel structure as shown in Figure 13, to aid in locating such panel structure 101 in the supporting frame structure 100.

After the panel structure has been located, it is desirable to drill and ream a hole in place through the end beam 122 of the panel structure, the wedges 159, and the flange of beam 103 at each set of wedges 159, through which hole dowel pins 161 are driven as shown in Figures 13 to 15, inclusive. By this means the panel structures 101 can be locked into position, the nuts on bolts 145 being tightened to clamp the wedges 159 between the panel structures and beams 103, thus adding to the rigidity of the apparatus as a whole. After the panel structures have been installed, the U-shaped members 152 and their associated bolts 153 and 155 may, if desired, be removed.

Although the mounting means employing the wedges and dowels are preferable, other means may be employed to mount the panel structures 101 in the supporting structure 100. Thus in the embodiment shown in Figures 16 and 17, an arrangement somewhat similar to that employed on the upper portion of the panel is shown. In the embodiment of these figures, spaced through bolts 162 pass through the end beam 122 of each panel structure 101 and through the adjacent flange of beam 103 of the supporting structure 100, said through bolts being provided with suitable clamping nuts 163. Between said through bolts is disposed a pusher bolt 164 threaded through the end beam 122 of the panel structure 101 and bearing against the adjacent flange of beam 103. A plurality, preferably two, of such sets may be disposed on each side of each panel structure to provide the desired lateral adjustment thereof. After the panel structure has been accurately located in place it can be locked in position by means of the through bolts 162 and their associated nuts 163.

The apparatus illustrated as embodying the present invention also provides important advantages in the assembly operation. Parts such as the main upright frame members 102, 102a, superstructure upright members 21, 21a and panel supporting structures 101 may be fabricated away from the assembly site, as in a welding shop, where they may be rapidly and accurately built up by jig welding operations. Sub-assemblies, such as the gear boxes and the drive mechanism assembly on the drive end superstructure upright member 21a, may be constructed elsewhere, as may other parts such as the shafting, gears, reels, collecting troughs, etc. Indeed, practically all parts may be manufactured elsewhere, so that the erection of the machine, even though it may be of large size, is primarily a simple assembly operation. Therefore, only a small working force and a small amount of time and labor are required to erect such apparatus, whereby the erection costs are held to a minimum.

Actual experience with the machines of the type illustrated has revealed that an erection procedure similar to that hereinafter described may be advantageously employed. According to this procedure the main upright frame members 102, 102a are erected first and connected by the longitudinally extending beams 87, 88 and 93. The resulting structure is then accurately aligned, said longitudinally extending beams being rigidly fixed to the uprights 102, 102a, after which permanent footings may be provided for said uprights, as by setting them in concrete. Thereafter, the panel structures 101 are set between the uprights 102, 102a and temporarily bolted in place, no attempt being made to accurately locate them at this time. In this position, they impart the necessary rigidity to the erected portion of the frame structure.

The superstructure is installed next, upright members 21, 21a being mounted on the corresponding main upright members 102, 102a and various longitudinal members 116, 117, etc., being connected therebetween. The beams 23 supporting the upper gear boxes 24 may next be installed, accurately located and locked in place, after which the coagulating trough aprons, mass tubes and pumps, etc., may be installed. Simultaneously or thereafter the substructure 115 supporting the driving drums 75 for the cap twisters may be mounted between the uprights 102, 102a, the drums and drum shafts 74 being aligned and the drive mechanism therefor being installed. Installation and alignment of the inclined drive shafts 64 for the reels and the horizontal drive shafts 62 on each panel structure 101 may be accomplished next, after which the panel structures as a whole may be accurately aligned with respect to each other longitudinally of the apparatus, and with respect to the apparatus as a whole, being locked in position.

The remaining parts, such as the collecting troughs 32, the couplings therebetween, reagent distributors 31 and other piping may next be installed, after which the reels themselves may be mounted and the apparatus completed.

Since all parts requiring accurate alignment are mounted by adjustable means, very little machining is required, which greatly reduces the cost of construction of the apparatus and also eliminates difficulties in erection which would be introduced by the necessity of accurately fitting together large machined parts. Parts as large as the panel structures 101, which may be as much as eight feet or more long and six feet or more high, can only be machined with difficulty, in addition to which distortion cannot be eliminated entirely. Without making such parts of extremely heavy construction, to make the machined parts fit closely would add considerably to the cost and difficulties in handling. Moreover, the welded design employed throughout the illustrated apparatus provides an apparatus which is of lightweight construction and yet possesses ample rigidity and strength for the purposes for which it is employed. The lightweight construction provides low costs of the apparatus and ease of handling in construction and shipping.

The apparatus of the present invention provides marked advantages in maintenance. As has been explained above, one of the primary requisites of continuous processing apparatus is that it shall operate for long periods of time without the necessity of shutdowns for repairs, adjusting parts, or for cleaning. Because of the design of the apparatus of the present invention, it is possible for operators to reach all parts of the apparatus while it is operating without the necessity of stopping the apparatus; this may be accomplished readily even though the apparatus is of relatively large size. In particular, the wholly unobstructed interior of the apparatus provided by the design of the frame structure is of extreme importance in this respect, since operators therein have easy access to the inclined drive shafts and associated mechanism, while through doors 165 in the floor 166 supported by cross beams 105 access may be had to the cap twister driving drums 75 and associated mechanism.

It is possible in the apparatus illustrated as embodying the present invention to halt the operation of various parts thereof for maintenance purposes or even for replacement without halting the remainder of the apparatus. Thus any series of reels may be disconnected from its drive mechanism and the reels or their inclined drive shafts replaced or adjusted without halting the remainder of the apparatus. Indeed, it is possible to remove any one of the gear boxes 63 from its longitudinally extending shaft 62 without halting the rotation of the shaft or of the apparatus as a whole, meanwhile losing only the production of the two series of reels driven from said gear box. This may be done by removing the cover and bearing cap holding shaft 62 in said gear box, disconnecting stub shafts 67 from inclined shafts 64, removing through bolts 143, dowel pins 144 and clutch levers 69, and swinging gear box 63 out from under shaft 62. Similarly, repairs may be effected on upper reels 5 and their associated gear boxes.

It is apparent that various modifications may be made in the illustrated apparatus; also, that apparatus embodying the features of the present invention may be employed in other manners and for other purposes than that indicated above, all without departing from the spirit of the invention. It is intended that the patent shall cover, by suitable expression in the appended claims, whatever features of patentable novelty reside in the invention.

What is claimed is:

1. Apparatus for handling thread comprising a panel; a plurality of adjacent series of rotatable thread-advancing thread-store devices mounted on said panel; a rotatable driving member mounted on said panel; means mounted on said panel for rotating said thread-advancing thread-store devices in said series from said rotatable member; a frame structure on which said panel is mounted; rotatable means mounted on said frame structure adapted to be connected to and drive said rotatable driving member mounted on said panel; and means adjustably mounting said panel on said frame structure whereby said rotatable driving member on said panel may be disposed in driving relation with said rotatable driving means on said frame structure.

2. Apparatus for handling thread comprising a panel; a plurality of adjacent series of rotatable thread-advancing thread-store devices mounted on said panel; a drive shaft rotatably mounted on said panel in the vicinity of each of said series of thread-advancing thread-store devices and adapted to rotate said thread-advancing thread-store devices in said series; a drive shaft rotatably mounted on said panel transversely of and adapted to rotate each of said first-mentioned drive shafts; a frame structure on which said panel is mounted; rotatable means mounted on said frame structure adapted to be connected to and drive said last-mentioned drive shaft mounted on said panel; and means adjustably mounting said panel on said frame structure whereby said last-mentioned drive shaft may be disposed in driving relation with said rotatable driving means on said frame structure.

3. Apparatus for handling thread comprising a panel; a plurality of adjacent series of rotatable elements mounted on said panel; a drive shaft rotatably mounted on said panel in the vicinity of each of said series of rotatable elements and adapted to rotate said rotatable elements in said series; a drive shaft rotatably mounted on said panel transversely of and adapted to rotate each of said first-mentioned drive shafts; a frame structure on which said panel is mounted; rotatable means mounted on said frame structure adapted to be connected to and drive said last-mentioned drive shaft mounted on said panel; and means adjustably mounting said panel on said frame structure whereby said last-mentioned drive shaft on said panel may be disposed in driving relation with said rotatable driving means on said frame structure.

4. Apparatus for processing thread comprising an upright frame structure; rotatable driving means on said frame structure; an upright panel formed independently of but supported by said frame structure; a plurality of adjacent downwardly extending series of rotatable thread-advancing thread-store devices mounted on said panel; means mounted on and extending transversely of said panel for supplying processing liquid to corresponding thread-advancing thread-storage devices in adjacent series; means mounted on and extending transversely of said panel for collecting the processing liquid applied to corresponding thread-advancing thread-store devices in adjacent series; a drive shaft rotatably mounted on said panel in the vicinity of each of said series of thread-advancing thread-store devices and adapted to rotate said thread-advancing thread-store devices in said series; a drive shaft rotatably mounted on and extending transversely of said panel and adapted to rotate each of said first-mentioned drive shafts; and means adjustably mounting said panel on said frame structure whereby said last-mentioned drive shaft on said panel may be disposed in driving relation with said rotatable driving member on said frame structure.

5. Apparatus for processing thread comprising an upright frame structure; an upright panel formed independently of but supported by said frame structure; a plurality of rotatable thread-advancing thread-store devices mounted on said panel; means mounted on said panel for supplying processing liquid to said thread-advancing thread-store devices; means mounted on said panel for collecting the processing liquid applied to said thread-advancing thread-store devices; a rotatable driving member mounted on said panel from which said thread-advancing thread-store devices are rotated; rotatable means mounted on said frame structure adapted to be connected to and to drive said driving member mounted on said panel; and means adjustably connecting said panel to said frame member.

6. Apparatus for processing thread comprising an upright frame structure; an upright panel formed independently of but supported by said frame structure; a plurality of adjacent downwardly extending series of thread-advancing thread-store devices mounted on said panel; and means mounted on and extending transversely of said panel for supplying processing fluid to corresponding thread-advancing thread-storage devices in adjacent series, said supply means being supported entirely by said panel.

7. Apparatus for processing thread comprising an upright frame structure; an upright panel formed independently of but supported by said frame structure; a plurality of adjacent downwardly extending series of thread-advancing thread-store devices mounted on said panel; means for applying processing liquid to said thread-advancing thread-store devices; and means mounted on and extending transversely of said panel for collecting the processing liquid applied to corresponding thread-advancing thread-store devices in adjacent series, said collecting means being supported entirely by said panel.

8. Apparatus for processing thread comprising an upright frame structure; an upright panel formed independently of but supported by said frame structure; a plurality of adjacent downwardly extending series of thread-advancing thread-store devices mounted on said panel; means mounted on and extending transversely of said panel for supplying processing liquid to corresponding thread-advancing thread-store devices in adjacent series; and means mounted on and extending transversely of said panel for collecting the processing liquid applied to corresponding thread-advancing thread-storage devices in adjacent series, said supply and collecting means being supported entirely by said panel.

9. Apparatus for handling thread comprising two oppositely facing rigid, upright panels; a plurality of downwardly extending series of rotatable thread-advancing thread-store devices mounted on the outer face of each of said panels; a frame structure formed independently of said panels and characterized by upright supporting members at the ends of said panels and transverse frame members connecting said supporting members together; and means rigidly connecting said panels to said supporting members, whereby said panels are caused to reinforce said frame structure.

10. Apparatus for handling thread comprising two oppositely facing rigid, upright panels; a plurality of downwardly extending series of rotatable thread-advancing thread-store devices mounted on the outer face of each of said panels; a frame structure characterized by upright supporting members at the ends of said panels and transverse frame members connecting said supporting members together; and means demountably but rigidly connecting said panels to said supporting members whereby said panels are caused to reinforce said frame structure.

11. Apparatus for handling thread comprising two oppositely facing rigid, upright panels; a plurality of rotatable elements mounted on the outer face of each of said panels; driving means for said elements mounted on said panels; a frame structure characterized by upright supporting members at the ends of said panels and transverse frame members connecting said supporting members together; and means adjustably but rigidly connecting said panels to said supporting members, whereby said panels may be accurately located and caused to reinforce said frame structure.

12. Apparatus for handling thread comprising two oppositely facing rigid, upright panels; a plurality of downwardly extending series of rotatable thread-advancing thread-store devices mounted on the outer face of each of said panels; upright supporting members disposed at and contacting the ends of said panels; means connecting said panels to said supporting members; and a superstructure including means for forming the thread mounted on said supporting members independently of said panels.

13. Apparatus for handling thread comprising two oppositely facing rigid, upright panels which are inclined towards each other; a plurality of downwardly extending series of rotatable thread-advancing thread-store devices mounted on the outer face of each panel; upright supporting members disposed at and contacting the ends of said panels, each of said supporting members including inclined beams to which the corresponding ends of said panels are connected; and a superstructure including means for forming the thread mounted on said supporting members independently of said panels.

14. Apparatus for handling thread comprising two oppositely facing rigid, upright panels which are inclined toward each other; a plurality of downwardly extending series of rotatable thread-advancing thread-store devices mounted on the outer face of each panel; upright supporting members disposed at and contacting the ends of said panels, each of said supporting members including inclined beams to which the corresponding ends of said panels are connected and a cross beam at the top thereof disposed below the tops of said panels; and a superstructure including means for forming the thread mounted independently of said panels on the tops of said supporting members.

15. Apparatus for handling thread comprising two oppositely facing rigid, upright panels which are inclined toward each other; a plurality of downwardly extending series of rotatable thread-advancing thread-store devices mounted on the outer face of each panel; means at the tops of said panels providing adjustment of said panels with respect to each other; a frame structure characterized by upright supporting members at the ends of said panels; and adjustable means rigidly connecting said panels at the ends thereof to said supporting members, whereby is provided an apparatus in which said panels may be adjusted with respect to each other and with respect to said frame structure but in which said panels cooperate to reinforce said frame structure.

GEORGE P. TORRENCE.
RICHARD F. BERGMANN.
WALTER F. KNEBUSCH.

CERTIFICATE OF CORRECTION.

Patent No. 2,284,497. May 26, 1942.

GEORGE P. TORRENCE, ET AL.

It is hereby certified that error appears in the printed specification of the above numbered patent requiring correction as follows: Page 3, first column, line 2, before "from" insert --liquid is applied--; and that the said Letters Patent should be read with this correction therein that the same may conform to the record of the case in the Patent Office.

Signed and sealed this 14th day of July, A. D. 1942.

(Seal)

Henry Van Arsdale,
Acting Commissioner of Patents.